US006790386B2

(12) United States Patent
Fefer et al.

(10) Patent No.: US 6,790,386 B2
(45) Date of Patent: Sep. 14, 2004

(54) DIELECTRIC FLUID

(75) Inventors: Michael Fefer, Whitby (CA); Tomoki Ruo, Oakville (CA)

(73) Assignee: Petro-Canada, Mississauga (CA)

( * ) Notice: Subject to any disclaimer, the term of this patent is extended or adjusted under 35 U.S.C. 154(b) by 192 days.

(21) Appl. No.: 10/112,858

(22) Filed: Apr. 2, 2002

(65) Prior Publication Data

US 2002/0139962 A1 Oct. 3, 2002

Related U.S. Application Data

(63) Continuation of application No. 09/513,134, filed on Feb. 25, 2000.

(51) Int. Cl.$^7$ .................................................. H04B 3/24

(52) U.S. Cl. ......................... 252/570; 252/581; 208/14; 208/18; 208/24; 208/46

(58) Field of Search ............................. 252/63, 59, 61, 252/73; 208/14

(56) References Cited

U.S. PATENT DOCUMENTS

| | | | |
|---|---|---|---|
| 4,124,489 | A | 11/1978 | Reid |
| 4,189,391 | A | 2/1980 | Kimura et al. |
| 4,584,129 | A | 4/1986 | Katayama |
| 5,017,733 | A | 5/1991 | Sato et al. |
| 5,158,665 | A | 10/1992 | Miller |
| 5,159,527 | A | 10/1992 | Flynn |
| 5,167,847 | A | 12/1992 | Olavesen et al. |
| 5,171,918 | A | 12/1992 | Subkin et al. |
| 5,246,566 | A | 9/1993 | Miller |
| 5,250,750 | A | 10/1993 | Shubkin et al. |
| 5,545,355 | A | 8/1996 | Commandeur et al. |
| 5,683,620 | A | 11/1997 | Pialet |
| 5,766,517 | A | 6/1998 | Goedde et al. |
| 5,912,215 | A | 6/1999 | Sapienza et al. |
| 5,949,017 | A | 9/1999 | Oommen et al. |
| 6,214,776 | B1 | 4/2001 | Angelo et al. |

*Primary Examiner*—Charles Boyer
*Assistant Examiner*—D. G. Hamlin
(74) *Attorney, Agent, or Firm*—Bereskin & Parr; Andrew I. McIntosh

(57) ABSTRACT

A dielectric fluid comprises an isoparaffinic base oil and hydrogen donor compound. The base oil may be a hydroisomerized isoparaffinic oil, and the hydrogen donor may be a substituted, or partially saturated aromatic compound. The resulting dielectric fluid exhibits negative hydrogen gassing properties along with good oxidative stability and low temperature performance.

38 Claims, No Drawings

DIELECTRIC FLUID

This is a cont. of Ser. No. 09/513,134 filed Feb. 25, 2000.

FIELD OF THE INVENTION

This invention relates to dielectric fluids for use in transformers. In particular, it relates to dielectric isoparaffinic based tranformer fluids.

BACKGROUND OF THE INVENTION

Conventional transformer oils are typically manufactured from a vacuum g oil fraction derived from naphthenic crudes and in particular light naphthenic distillates. Although transformer oils made from naphthenic crudes perform adequately they are inherently deficient in certain respects. For example, naphthenics are compositionally rich in potentially toxic aromatics and as result there is a desire for compositionally cleaner transformer fluids. At the same time, some of the nathphenic crudes, which are especially suitable for transformer oil manufacture, are being to dwindle. As a result there is a desire to supplement the transformer oil pool with other sources.

Attempts have been made to develop paraffinic-based transformer oils. However, none has been successfully commercialized as they have been deficient in several respects Specifically, such paraffinic based transformer oils have inherently poor low temperature viscometric properties. Also they do not exhibit negative gassing performance as determined by ASTM D2300B, which is considered by the electrical industry to be an important feature Consequently, naphthenic based transformer oils which have inherent pour points of <−40° C. and exhibit negative gassing are sill preferred by the electrical industry. Negative gassing performance is important since in the event that hydrogen is evolved due to electrical stress the fluid tends to absorb the evolved hydrogen thus reducing the chances of an explosion.

U.S. Pat. No. 5,167,847 to Olavesen et al. discloses a transformer oil derived from a hydrocracked, solvent dewaxed base oil having a pour point of about −21° C. This is achieved by the addition of antioxidant and 0.01 to 2.0 wt. % of a pour point depressant. The transformer oil has a positive gassing tendency, U.S. Pat. No. 4,124,489 to Reid discloses a transformer oil from waxy crudes by double solvent extracting a raw, untreated, light distillate fraction from a waxy crude oil to produce a second, wax-containing extract. The second extract oil is mildly cracked by hydrotreating, also reducing the sulfur content and improving the viscosity, oxidation and color stability thereof. The hydrotreated oil is then distilled to produce a transformer oil feedstock of relatively low wax content as a heart cut fraction having a 5 to 95 LV % boiling range between about 595° F. and about 750° F. The transformer oil feedstock may then be dewaxed to produce a finished transformer oil.

G. L. Goedde et al (U.S. Pat. No. 5,766,517) discloses transformer oils made from synthetics such as poly alpha olefins (PAOs) or blends of synthetics and certain aromatic and olefinic additives which are added to yield negative gassing products. The transformer oils can be made by blending a PAO, for example made by the oligomerization of decene with an aromatic stream. One drawback to this approach is that, because of the cost of the PAO, the end product is very expensive in comparison with traditional transformer oils.

Sapienza (U.S. Pat. No. 5,912,215) discloses the manufacture of a food grade transformer oil based on blending a synthetic poly alpha olefin or a technical white oil with 10 to 70% of an unsaturated hydrocarbon, such as unsaturated poly alpha olefin decene dimer or polyisobutene. The drawbacks to this approach are high cost in the case of PAO and poor low temperature performance in the case of technical white oils. Additionally, olefins are oxidatively very unstable and as a result pose a potential oxidative and thermal instability problem in the event that the antioxidant which, are part of any transformer oil formulation, is depleted.

U.S. Pat. No. 5,949,017 to Oommen et al. discloses a transformer fluid derived from high oleic acid triglyceride compositions that include fatty acid components of at least 75% oleic acid, less than 10% di-unsaturated fatty acid component; less than 3% tri-unsaturated fatty acid component; and less than 8% saturated fatty add component. Although the fluid is biodegradable it is relatively expensive in comparison with conventional naphthenic transformer oils. Additionally, as with any ester there is the concern of hydrolytic stability in case the oil is inadvertently exposed to water and high temperatures.

Commandeur et al. (U.S. Pat. No. 5,545,355), teaches how to make a transformer fluid for low temperature applications. The fluids include a mixture of benzyltoluene and (methylbenzyl)xylene isomers, notably a mixture of benzyltoluene/dibenzyltoluene isomers with (methylbenzyl) xylene/di(methylbenzyl)xylene isomers.

Shubkin et al (U.S. Pat. No. 5,250,750) discloses an electrical insulating fluid based on compositions containing up to 25 weight percent of one or more oil additives and a 1-octene and/or 1-decene dimer and/or a 1-octene and 1-decene co-dimer oil having improved low temperature properties. The fluid contains less than about 25 weight percent of 7-methylpentadecene, 9-methylnonadecene and, 7- and 9-methylheptadecene isomers, respectively.

Sato et al. (U.S. Pat. No. 5,017,733) describes an electrical insulating oil composition which has 45% by weight or more of at least 2 members selected from the group consisting of (a) m-ethylbiphenyl, (b) p-ethylbiphenyl, (b) p-ethylbiphenyl, (c) o-benzyltoluene, (d) m-benzyltoluene, (e) p-benzyltoluene, and (f) 1,1-diphenylethane. The remainder of non-condensed bicyclic aromatic hydrocarbons have no more than 17 carbon atoms.

Accordingly, there still exists a need for a paraffinic based transformer oil which exhibits acceptable low temperature pour points and negative gassing properties.

SUMMARY OF THE INVENTION

It has now been discovered that it is possible to make a cost effective dielectric fluid from isoparaffinic oils, and preferably from hydroisomerized paraffinic oils. The formed dielectric fluids exhibit low temperature performance and oxidation stability which is equal to, or superior to, that observed with naphthenics. Transformer oils based on these types of hydroisomerized fluids exhibit excellent biodegradability characteristics.

Additionally, the present invention is directed to an isoparaffinic based transformer oil, which exhibits negative gassing properties and has a low temperature pour point. In one aspect, the present invention relates to a transformer oil comprising a base oil and a hydrogen donor. In a preferred embodiment, the transformer oil base stock is prepared from a isomerized or isoparaffinic oil, which is obtained from a sequential hydrocracking/hydroisomerization/hydrogenation process. The hydrogen donor may be any compound which contains labile hydrogen, for example a partially saturated aromatic compound such as tetrahydronaphthalene, alkyl substituted tetrahydronaphthalene compounds or alkylated benzenes. The transformer oil may also include one or more anti-oxidant compounds.

In another aspect, the present invention relates to a process for reducing the volume of hydrogen gas evolved from a transformer oil, the process comprising adding at least one hydrogen donor to the transformer oil. In a preferred aspect, the compound is tetrahydronaphthalene, alkylated tetrahydronaphthalenes and alkylated benzenes, and from about 0.1 to about 10 wt % is added to the transformer oil, based on the weight of the transformer oil.

DESCRIPTION OF THE PREFERRED EMBODIMENT

It has now been discovered that it is possible to make a cost effective dielectric fluid from paraffinic feedstocks, hydrocracked paraffinic oils, waxes, synthetic paraffins or mixtures thereof. Preferably, the paraffins are isoparaffins, and more preferably, they are isoparaffins formed by hydroisomerization of the feedstock. The formed dielectric fluids, when fortified with standard antioxidants, exhibit exceptional low temperature performance and oxidation stability, which is equal to, or superior to, that observed with naphthenics or synthetics such as poly alpha olefins. In addition, transformer oils based on these type of hydroisomerized fluids exhibit excellent biodegradability characteristics and are non toxic in nature. Importantly, the fluids exhibit negative gassing properties.

Preferably, the fluids in accordance with the present invention are isoparaffins, made by the hydroisomerization of a paraffinic feedstock.

The fluids may be prepared from paraffinic oils by any known method of hydroisomerization. Typically, the hydroisomerization process is carried out in two or three stages, a first hydrocracking or hydrotreating step, followed by a hydroisomerization and an optional hydrofinishing or hydrogenation step. Hydrocracking or hydrotreating, hydroisomerization, and hydrofinishing or hydrogenation procedures are well known in the art, and any such procedure may be used in accordance with the present invention.

Suitable feedstocks for the hydrocracking step include those which are rich in normal paraffins, such as waxy gas oils, and slack wax from a solvent dewaxing process. If the initial feedstock is rich in normal paraffins which do not contain significant levels of sulphur and nitrogen contaminants (eg. a refined wax, normal paraffins made by a Fischer Tropsch process, or a synthetic polyethylene wax), then it does not need to be subjected to the hydrocracking or hydrotreating process, and may be immediately hydroisomerized.

In the hydrocracking or hydrotreating step, polynuclear aromatics are converted into smaller, hydrogenated species, and sulphur and nitrogen molecules are eliminated (which may contaminate the hydroisomerization catalyst). The hydrocracking is typically completed using a sulphided catalyst based on VIIIB or VIB metals such as Ni/W or Co/Mo on an alumina or crystalline alumino silicate carrier. While appropriate hydrocracking process parameters will be known to those skilled in the art, generally speaking, the hydrocracking process may be carried out at a temperature between about 200° C. and about 450° C., at hydrogen gas pressures between about 100 psig and about 5000 psig, a hydrogen circulation rate between about 400 SCF/B and about 15,000 SCF/B, and a liquid hourly space velocity between about 0.1 $hr^{-1}$ and about 20 $hr^{-1}$.

The primary reaction during hydroisomerization is the conversion of the normal or linear paraffins into isoparaffins which serves to reduced the pour point of the material. Typically, hydroisomerization is carried out using a crystalline silicoaluminophosphate molecular sieve catalyst which optionally contains group VIIIB and IIA metals such as platinum or palladium. Hydroisomerization is carried out at temperatures of 250 to 450° C., at hydrogen gas pressures of 100 to 5000 psig, a hydrogen circulation rate of 400 to 15,000 SCF/B and liquid hourly space velocity of 0.1 $hr^{-1}$ to 20 $hr^{-1}$.

After hydroisomerization, the fluid may be hydrofinished or hydrogenated. The purpose of hydrofinishing is to convert unstable species, such as olefins, into more stable, saturated compounds (to prevent subsequent oxidation). While hydrofinishing or hydrogenation processing parameters are well known to those skilled in the art, generally speaking, the hydrofinishing process may be carried out at a temperature between about 190° C. and about 340° C., a pressure between about 400 psig and about 5000 psig, and a hydrogen circulation rate between about 400 SCF/B and about 15,000 SCF/B. The hydrofinishing or hydrogenation operation preferably is conducted in the presence of a solid metal hydrogenation catalyst such as Ni, Pt or Pd on an alumina support.

Preferably, the finished hydroisomerized paraffin product made in accordance with the invention has a low natural pour point of −30° C. to <−60° C. More preferably, it has a natural pour point of less than −45° C. Generally speaking, the pour point may be controlled by the degree of hydroisomerization. The greater the degree of isomerization, the lower the pour point of the resulting isoparaffin.

If desired, one or more pour point depressants may be added to the hydroisomerized paraffins to further depress the pour point of the product. It has been discovered that hydroisomerized fluids respond exceptionally well to the addition of pour point depressants. Examples of such pour depressants include pour point depressants based on polymethacrylate chemicals such as Acryloid™ 155C made by RomMax. Depending on the pour point of the hydrocracked/hydroisomerised/hydrogenated oil, the amount of pour point depressant added to the dielectric fluid can vary from zero to a small amount. Preferably, about 0.01 wt % to about 0.2 wt % of a polymethacrylate pour point depressant (based on the weight of the dielectric fluid) is added to depress the pour point to below −45° C.

The fluids of the present invention have negative or reduced gassing tendency. Preferably, a hydrogendonating additive is included in the dielectric fluid to reduce its gassing tendency. In terms of its chemical structure, the general class of additives that are effective at improving (i.e. lowering) the hydrogen gassing value are molecules that incorporate within them labile hydrogen atoms. Such hydrogen donors include alkyl substituted or unsubstituted, partially saturated poling aromatics (e.g. polyaromatics with some degree of saturation), alkylated one ring aromatics (e.g. alkylated benzenes), or alkylated polyring aromatics. Surprisingly, unsubstituted, fully aromatic compounds such as naphthalene do not affect the hydrogen gassing value. Accordingly, the additive may be any compound or mixture of compounds, which is a hydrogen donor other than an unsubstituted aromatic compound. More preferably, the hydrogen donor is a bicyclic, partially saturated, aromatic compound, or an alkylated benzene compound. Examples of such bicyclic, partially saturated compounds include di- and tetra-hydronaphthalene compounds, and alkylated hydronaphthalene compounds. Most preferably, the hydrogen donor is an alkylated tetrahydronaphthalene.

Some specific examples of suitable hydrogen donating compounds include dihydrophenanthrene, phenyl ortho xylyl ethane, alkylated benzenes, Dowtherm RPT™ (tetrahydro-5-(1-phenylethyl)-naphthalene), acenapthene, tetrahydronaphthalene, alkylated tetrahydronaphthalenes, and tetrahydroquinoline, although the latter is less preferred because of its toxic properties.

Without being limited by the theory, it is believed that, in use, transformers are subject to high electrical stresses which cause bonds to break in the dielectric fluid. Without the hydrogen donor additive of the invention, hydrogen is evolved from the dielectric fluid. In the presence of the additive, radical bond breaking reactions are inhibited which ultimately leads to a reduction in the evolution of hydrogen. Hydrogen donor molecules may be added to the dielectric fluid in amounts from about 0.1 wt % to about 10 wt % based on the weight of the dielectric fluid, preferably from about 1 wt % to about 5 wt % based on the weight of the dielectric fluid.

It has been observed that some of the hydrogen donor molecules used to suppress hydrogen gassing can impart unwanted odor characteristics and poorer aquatic toxicity characteristics. It has further been found that it is possible to control the odor and aquatic toxicity characteristics of the dielectric fluids while maintaining negative gassing performance, by varying the number of carbon atoms in the hydrogen donating compound. This is accomplished by the addition of from about 0.1 wt % to about 10 wt % of a hydrogen donor compound (based on the weight of the dielectric fluid) where the total carbon number of the additive molecule is greater than a certain threshold value, which depends upon the type of hydrogen donor. For example, in the case of alkylated benzenes, the preferred threshold value for the carbon number is 15; that is in this instance, preferably, the hydrogen donor should have at least 15 carbon atoms. Similarly, for tetrahydronaphthalene based hydrogen donors, preferably the hydrogen donor has at least 13 carbon atoms. The relevant threshold may be determined experimentally by measuring the gassing performance against aquatic toxicity. Aquatic toxicity and water solubility decreases as the number of carbon atoms in the hydrogen donor increases.

The oxidative stability of the dielectrical fluid may be enhanced by the addition of one or more antioxidants. Many antioxidant additives are well known in the art, and any is suitable for use with the present invention. Examples of suitable antioxidants include hindered phenols such as di-butyl-paracresol (DBPC), cinnamate type phenolic esters and alkylated diphenylamines. The antioxidant may be added in any suitable amount, and is preferably added in an amount between about 0.01 wt % to about 1.0 wt % based on the weight of the dielectric fluid. More preferably, the antioxidant is added in an amount between about 0.08 wt % to about 0.40 wt % based on the weight of the dielectric fluid.

The invention will be further understood by reference to the following examples which are not to be construed as a limitation on the invention. Those skilled in the art will appreciate that other and further embodiments are obvious and within the spirit and scope of this invention from the teachings of the examples taken with the accompanying specifications.

EXAMPLE 1

A fully formulated transformer oil was prepared and tested to determine whether it met the CSA requirements. The electrical oil was prepared by the sequential hydrotreating/hydroisomerization/hydrogenation/distillation of a paraffinic vacuum gas oil feedstock according to the Chevron process described by Miller in U.S. Pat. No. 5,246,566. The properties of the baseoil are presented in Table 1:

TABLE 1

| | |
|---|---|
| Colour (ASTM D1500) | <0.5 |
| Viscosity @ 40° C., cSt (ASTM D445) | 8.616 |
| Viscosity @ 100° C., cSt (ASTM D445) | 2.436 |
| Density @ 15° C., kg/Liter (ASTM D1298) | 0.8210 |
| Flash, Cleveland Open Cup, ° C. (ASTM D92) | 178 |
| Pour, ° C. (ASTM D97) | <−45 |
| Sulphur, wt % (ASTM D1275) | <0.001 |
| Nitrogen, ppm (ASTM) | <2 |
| Saturates, wt % (PCM 528) | >99 |
| Aromatics + Polars, wt % (PCM 528) | <1 |

The inherent pour point of the initial material was lower than the CSA requirement of −46° C.

EXAMPLE 2

The gassing tendency of commercially available naphthenic transformer oil (Voltesso 35™) was tested to be −17.2 μL/min. Table 2 demonstrates the effect of adding various hydrogen donors to an isoparaffinic baseoil made in accordance with the process described by Miller referred to in Example 1 (produced by sequential hydrocracking/hydroisomerization/hydrogenation of a paraffinic vacuum gas oil feedstock). The base oil had >95 wt % saturates as determined by high resolution mass spectometry (method PCM528). As is evident from Table 2, some of the hydrogen donor compounds (ie. the partially hydrogenated multi ring compounds and the alkylbenzenes) had a significant effect on suppressing gassing while the alkylated polynuclear aromatic molecules did not have a significant impact. Also, the greater the amount of labile hydrogen atoms the greater the suppressing effect—for example, Dihydrophenanthrene is much less effective than tetrahydronaphthalene. This is interesting since it was previously assumed that good gassing performance was purely a function of the aromatics or polynuclear aromatics level.

The compounds which performed best were the alkylated benzenes, and tetrahydronaphthalene. Addition of about 1 wt % to about 5 wt % of these compounds produced gassing level performance which approached, or surpassed (ie. depressed below) that observed for the commercial naphthenic oil which was measured at −17.2 μL/min (ASFM D2300B).

TABLE 2

Impact Hydrogen Donor on Gassing Tendency of a Hydrocracked/Hydroisomerized/Hydrogenated Baseoil

| Hydrogen Donor, wt % | Hydrogen Gassing, μL/min) (ASTM D2300B) |
|---|---|
| None | 51.7 |
| 1 wt % Acenaphthene | −6 |
| 1 wt % Dihydrophenanthrene | 27.8 |
| 1 wt % Tetrahydronaphthalene | −13.8 |
| 2 wt % Tetrahydronaphthalene | −26.4 |
| 5 wt % Methyltetrahydronaphthalene | −18.3 |
| 1 wt % Diethylbenzene | −19.5 |
| 2 wt % Diethylbenzene | −43.8 |
| 1 wt % Alkylated naphthalene | 40.2 |
| 5 wt % Diisopropylbenzene | −41.8 |
| 1 wt % n-butylbenzene | −2.0 |

EXAMPLE 3

A fully formulated transformer oil was manufactured using a baseoil produced by the sequential hydrocracking/hydroisomerization/hydrogenation of a waxy gas oil by blending together the baseoui, 0.08 wt. % dibutylparacresol (DBPC, an antioxidant) and 2 wt. % of tetrahydronaphthalene (a hydrogen donor). The finished product possessed the properties shown in Table 3. In Table 3, “CSA-C50-97” indicates the Canadian Standards Association minimum performance requirements for dielectric fluids used in transformer oils.

TABLE 3

| | HC/HI/H(1) | Naphthenic | CSA-C50-97 |
|---|---|---|---|
| Viscosity @ 40° C., cSt (ASTM D445) | 8.49 | 8.3 | 10 max |
| Viscosity @ 0° C., cSt (ASTM D445) | 41.93 | 50 | 75 max |
| Viscosity @ −40° C., cSt (ASTM D445) | 1061 | 2000 | 2500 max |
| Viscosity @ 100° C., cSt (ASTM D445) | 2.35 | 2.2 | |
| Density @ 15° C., kg/Liter (ASTM D1298) | 0.8718 | 0.868 | 0.906 |
| Flash, COC, ° C. (ASTM D92)166 | 158 | | |
| Pour, ° C. (ASTM D97) | <−46 | <−46 | −46 max |
| Sulphur, wt % (ASTM D1275) | <0.001 | | |
| Nitrogen, ppm (ASTM) | <2 | | |
| Saturates, wt % (PCM 528) | >97.5 | 78 | |
| Aromatics + Polars, wt % (PCM 528) | <2.5 | 22 | |
| Gassing (ASTM D2300B), μL/min | −26.4 | −17.2 | |
| Dielectric Breakdown Voltage @ 25 C. | | | |
| Impulse Strength, kV (ASTM D3300) | 292 | 170 | 145 min |
| Power Factor @ 60 Hz, 100 C., % (ASTM D924) | 0.007 | 0.25 | <0.01 |
| Dielectric Breakdown Voltage @ 60 Hz (ASTM D877) | 50 | 48 | 30 min |
| Oxidation Stability (ASTM D2440) D2440, 24h | | | |
| Visible Sludge | nil | nil | |
| TAN, mg KOH/g | <0.1 | 0.06 | |
| D2440, 64h | | | |
| Visible Sludge | nil | 0.11 | |
| TAN, mg KOH/g | <0.1 | 0.26 | |
| D2440, 164h | | | |
| Visible Sludge | nil | | |
| TAN, mgKOH/g | <0.1 | | |

(1) HC/HI/H = hydrocracked/hydroisomerized/hydrogenated

As can be seen, the formulated transformer oil met all of the physical property requirements defined in the CSA tests. In addition, the 24 hour, 64 hour and 164 hour test results, as well as the electrical tests results (for example, power factor, dielectric breakdown) were either better or similar to those obtained with the naphthenic based oil. This was also the case for the dielectric tests. Further, the gassing performance for the hydrocracked/hydroisomerized/hydrogenated transformer oil was −26.4 μL/min.

EXAMPLE 4

The biodegradability of a fully formulated transformer oil base described in Example 3 was evaluated using the standard OECD 301B biodegradability test. In accordance with the tests, at 28 days, the there was 60% degradation, meaning that the transformer oil can be classified as “readily biodegradeable”.

EXAMPLE 5

Trials were carried out using industrial size transformers. Two 4.1 kV pad transformers were chosen. One unit was drained of a commercially available naphthenic oil, flushed and refilled with test fluid made from the baseoil described in Example 1, while the other unit was drained and refilled with fresh naphthenic transformer oil (Voltesso 35™).

The test fluid was prepared by the sequential hydrotreatment, hydroisomerization, and hydrogenation and subsequent atmospheric and vacuum distallation of a paraffinic vacuum bottoms feedstock. To the test fluid was added 0.08 wt. % DBPC antioxidant and 2 wt. % of tetrahydronaphthalene (the anti-gassing additive).

The physical properties of the finished test fluid are shown in Table 4.

TABLE 4

| | |
|---|---|
| Density, kg/L @ 15° C. | 0.8718 |
| Viscosity @ 100° C., cSt | 2.35 |
| Viscosity @ 40° C., cSt | 8.186 |

TABLE 4-continued

| | |
|---|---|
| Viscosity @ −40° C., cSt | 1627 |
| Pour Point, ° C. | <−45 |
| Flash, COC, ° C. | 166 |
| Colour, ASTM | <0.5 |

The condition of the transformer unit was evaluated every few weeks. The evaluation included routine gas analysis and electrical tests, D2300 hydrogen gassing tendency, and D2440 oxidation stability (@72 h and 164 h).

The electrical loading and performance of the two transformers was continuously monitored. Analysis of the data indicated that the two transformers operated "normally" over the period of the test run.

The gassing results are shown in Table 5. The starting date of the test was Jun. 2, 1998. The results show that gassing tendency of the test fluid is significantly lower than that obtained with the commercial naphthenic oil and that the gassing levels remained relatively constant over time.

TABLE 5

| Gassing Tendency of Hydrocracked/Hydroisomerized/Hydrogenated Transformer Oil | | | | |
|---|---|---|---|---|
| Date | 08 Jun. 1998 | 30 Jun. 1998 | 05 Aug. 1998 | 02 Sep. 1998 |
| Gassing, μL/min (ASTM D2300B), μL/min | −41.2 | −46 | −37.3 | −51.6 |
| **Gassing Tendency of Conventional Naphthenic Transformer Oil** | | | | |
| Date | 08 Jun. 1998 | 30 Jun. 1998 | 05 Aug. 1998 | 02 Sep. 1998 |
| Gassing, μL/min (ASTM D2300B), μL/min | −11 | −11.7 | −12 | −11.9 |

Results of the 76 hour and 164 hour D2440 tests are shown in Table 6. The oxidation stability of the test fluid was exceptionally good. It would pass the Canadian Standards Association ("CSA")/ASTM oxidation requirements for uninhibited and inhibited electrical oils which may contain up to 0.4 wt % DBPC. Electrical oils containing 0.08 wt. % and less are considered to be uninhibited. In contrast, the naphthenic transformer oil only met the oxidation requirements for uninhibited oils.

TABLE 6

| | Date | | | | | CSA | | ASTM3487 | |
|---|---|---|---|---|---|---|---|---|---|
| | initial | 08 Jun. 1998 | 30 Jun. 1998 | 05 Aug. 1998 | 02 Sep. 1998 | UnInhibited | Inhibited | UnInhibited | Inhibited |
| **Oxidation Stability of Hydrocracked/Hydroisomerized/Hydrogenated Transformer Oil** | | | | | | | | | |
| ASTM D2440 72 hours | | | | | | | | | |
| Sludge, wt % | <0.01 | | | <0.01 | | 0.1max | | 0.15max | 0.1max |
| Total Acids, mgKOH/g | 0.01 | | | 0.01 | | 0.4max | | 0.5 max | 0.3max |
| 164 hours | | | | | | | | | |
| Sludge, wt % | <0.01 | <0.01 | <0.01 | <0.01 | 0.01 | 0.2max | 0.05max | 0.30max | 0.2max |
| Total acids, mgKOH/g | 0.01 | 0.01 | 0.01 | 0.01 | 0.04 | 0.5max | 0.2 max | 0.6 max | 0.4max |
| **Oxidation Stability of Naphthenic Transformer Oil** | | | | | | | | | |
| ASTM D2440 72 hours | | | | | | | | | |
| Sludge, wt % | | | | 0.02 | | 0.1max | | 0.15max | 0.1max |
| Total Acids, mgKOH/g | | | | 0.11 | | 0.4max | | 0.5 max | 0.3max |
| 164 hours | | | | | | | | | |
| Sludge, wt % | 0.08 | 0.08 | 0.08 | 0.08 | 0.12 | 0.2max | 0.05max | 0.30max | 0.2max |
| Total Acids, mgKOH/g | 0.26 | 0.26 | 0.27 | 0.2 | 0.36 | 0.5max | 0.2 max | 0.6 max | 0.4max |

Example 6

The following example demonstrates the effect of the molecular weight or carbon number of the hydrogen donor additive on the aquatic toxicity and odor of a transformer fluid. In the cases shown below sufficient hydrogen donor was added to achieve a negative gassing value to a product (known as P657™, sold by Petro-Canada) produced by the sequential hydrocracking/hydroisomerization/hydrogenation of a waxy vacuum gas oil. Aquatic toxicity was determined by exposing Daphnia magna to 500,000 ppm of a transformer oil and observing mortality rate after a period of 48 h. The results are shown in Table 7.

TABLE 7

Aquatic Toxicity and Odor Characteristics

| | NBB | DEB | DIPB | TIPB |
|---|---|---|---|---|
| Carbon # | 10 | 10 | 12 | 15 |
| n-butyl Benzene | 1 | | | |

TABLE 7-continued

| Aquatic Toxicity and Odor Characteristics | | | | |
|---|---|---|---|---|
| DiEthyl Benzene | | 0.5 | | |
| Diisopropyl Benzene, % | | | 5 | |
| Triisopropyl Benzene, % | | | | 3 |
| Hydroisomerized Bascoil P65, % | 99 | 99.5 | 95 | 97 |
| Odor | Strong | Strong | Mild | Very Weak |
| Gassing Tendency, μl/min (ASTM D2300B) | −2 | −19.5 | −41.8 | −8.5 |
| Daphnia, % mortality @ 500,000 ppm | 100 | 100 | 100 | 0 |

(1) NBB - n-butyl Benzene
(2) DEB - Diethyl Benzene
(3) DIPB - Diisopropyl Benzene
(4) TIPB - Triisopropyl Benzene

| | MT(1) | IPT(2) |
|---|---|---|
| Carbon # | 11 | 13 |
| Methytetralin | 2.5 | |
| Isopropyltetralin | | 6 |
| Hydroisomerized Baseoil P65, % | 97.5 | 94 |
| Odor | Strong | Very Weak |
| Gassing Tendency, μl/min (ASTM D2300B) | −10 (3) | −5 (3) |
| Daphnia, % mortality @ 500,000 ppm | 100 | 0 |

1. MT - Methyltetralin
2. IPT - Isopropyltetralin
3. Extrapolated

As can be seen from Table 7, by increasing the number of carbon atoms in the hydrogen donor molecule, the odor and toxicity of the transformer oil can be reduced while still maintaining negative gassing performance. In the first example (relating to alkylated benzene hydrogen donors), use of a hydrogen donor having at least 15 carbon atoms resulted in an oil having a very mild odor, low toxicity, and negative gassing performance. Similarly, for tetrahydonaphthalene based hydrogen donors, the minimum carbon number required to achieve a low odor and aquatic toxicity characteristics, while maintaining negative gassing performance was determined to be 13.

What is claimed is:

1. A dielectric fluid comprising a hydroisomerized isoparaffinic oil and at least one hydrogen donor compound.

2. The dielectric fluid as claimed in claim 1, additionally comprising an antioxidant.

3. The dielectric fluid as claimed in claim 1 wherein the hydroisomerized isoparaffinic oil is prepared by hydroisomerizing a base oil feedstock.

4. The dielectric fluid as claimed in claim 3 wherein the base oil feedstock is hydrocracked prior to hydroisomerizing.

5. The dielectric fluid as claimed in claim 3 wherein after hydroisomerizing the base oil feedstock is hydrotreated.

6. The dielectric fluid as claimed in claim 3, wherein the base oil feedstock comprises a paraffinic vacuum gas oil.

7. The dielectric fluid as claimed in claim 1 wherein the hydrogen donor comprises at least one compound selected from the group consisting of partially saturated polyring aromatics, alkylated one ring aromatics, alkylated polyring aromatics, partially saturated alkylated polyring aromatics, and mixtures thereof.

8. The dielectric fluid as claimed in claim 7 wherein the hydrogen donor comprises a substituted tetrahydronaphthalene.

9. The dielectric fluid as claimed in claim 8, wherein the hydrogen donor comprises an alkyl substituted tetrahydronaphthalene.

10. The dielectric fluid as claimed in claim 7 wherein the hydrogen donor comprises at least one compound selected from the group consisting of dihydrophenanthrenene, alkylated benzenes, tetrahydro-5-(1-phenylethyl)-naphthalene, tetrahydroquinolines, tetrahydronaphthalenes, and acenaphthenes.

11. The dielectric fluid as claimed in claim 1 wherein the hydrogen donor comprises from about 0.1 wt % to about 10 wt % based on the weight of the dielectric fluid.

12. The dielectric fluid as claimed in claim 11 comprising from about 1 wt % to about 5 wt % of the hydrogen donor compound based on the weight of the dielectric fluid.

13. The dielectric fluid as claimed in claim 10 comprising from about 0.1 wt % to about 10 wt % of the hydrogen donor compound based on the weight of the dielectric fluid.

14. The dielectric fluid as claimed in claim 13 comprising from about 1 wt % to about 5 wt % of the hydrogen donor compound based on the weight of the dielectric fluid.

15. The dielectric fluid as claimed in claim 12 additionally comprising a pour point depressant.

16. The dielectric fluid as claimed in claim 15 wherein the pour point depressant is present in an amount between about 0.01 wt % and about 0.2 wt % based on the weight of the dielectric fluid.

17. The dielectric fluid as claimed in claim 14 additionally comprising a pour point depressant.

18. The dielectric fluid as claimed in claim 17 wherein the pour point depressant is present in an amount between about 0.01 wt % to about 0.2 wt % based on the weight of the dielectric fluid.

19. The dielectric fluid as claimed in claim 2, wherein the antioxidant comprises at least one compound selected from the group cconsisting of hindered phenols, cinnamate type phenolic esters, alkylated diphenylamines and mixtures thereof.

20. The dielectric fluid as claimed in claim 19, wherein the antioxidant comprises di-butyl-paracresol.

21. The dielectric fluid as claimed in claim 17 additionally comprising an antioxidant.

22. The dielectric fluid as claimed in claim 21, wherein the antioxidant comprises at least one compound selected from the group consisting of hindered phenols, cinnamate type phenolic esters, alkylated diphenylamines and mixtures thereof.

23. The dielectric fluid as claimed in claim 22, wherein the antioxidant comprises di-butyl-paracresol.

24. The dielectric fluid as claimed in claim 10 wherein the hydrogen donor is an alkylated benzene compound having at least 15 carbon atoms.

25. The dielectric fluid as claimed in claim 10, wherein the hydrogen donor is a tetrahydronaphthalene based compound having at least 13 carbon atoms.

26. A method of reducing the amount of hydrogen gas evolved from a hydroisomerized ispoaraffinic dielectric fluid comprising adding a hydrogen donor compound to the hydroisomerized isparaffinic oil.

27. The method as claimed in claim 26 wherein the hydroisomerized isoparaffinic oil is produced by hydroisomerizing a base oil.

28. The dielectric fluid as claimed in claim 27 wherein the base oil feedstock is is hydrocracked prior to hydroisomerizing.

29. The dielectric fluid as claimed in claim 27 wherein the base oil feedstock is hydrotreated after hydroisomerizing.

30. The method as claimed in claim 27, wherein the base oil feedstock comprises a paraffinic vacuum gas oil.

31. The method as claimed in claim 26 wherein the hydrogen donor comprises at least one compound selected from the group cconsisting of partially saturated polyring aromatics, alkylated one ring aromatics, alkylated polyring aromatics, partially saturated alkylated polyring aromatics, and mixtures thereof.

32. The method as claimed in claim 31 wherein the hydrogen donor comprises a substituted tetrahydronaphthalene.

33. The method as claimed in claim 32 wherein the hydrogen donor comprises an alkylated tetrahydronaphthalene.

34. The method as claimed in claim 31 wherein the hydrogen donor comprises at least one compound selected from the group cconsisting of dihydrophenanthrenene, alkylated benzenes, tetrahydro-5-(1-phenylethyl)-naphthalene, tetrahydroquinolines, tetrahydronaphthalenes, and acenaphthenes.

35. The method as claimed in claim 26 wherein the hydrogen donor comprises from about 0.1 wt % to about 10 wt % based on the weight of the dielectric fluid.

36. The method as claimed in claim 35 wherein the hydrogen donor comprises from about 1 wt % to about 5 wt % based on the weight of the dielectric fluid.

37. The method as claimed in claim 34 wherein the hydrogen donor comprises from about 0.1 wt % to about 10 wt % based on the weight of the dielectric fluid.

38. The method as claimed in claim 37 wherein the hydrogen donor comprises from about 1 wt % to about 5 wt % based on the weight of the dielectric fluid.

* * * * *